United States Patent
Winter

(10) Patent No.: US 7,113,469 B2
(45) Date of Patent: Sep. 26, 2006

(54) METHOD FOR RECORDING DATA STREAMS WITH A LOW BIT RATE

(75) Inventor: Marco Winter, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 682 days.

(21) Appl. No.: 10/343,362

(22) PCT Filed: Jul. 23, 2001

(86) PCT No.: PCT/EP01/09349

§ 371 (c)(1), (2), (4) Date: Jan. 30, 2003

(87) PCT Pub. No.: WO02/13195

PCT Pub. Date: Feb. 14, 2002

(65) Prior Publication Data

US 2004/0022159 A1  Feb. 5, 2004

(30) Foreign Application Priority Data

Aug. 3, 2000  (DE) ................................ 100 38 549

(51) Int. Cl.
G11B 7/0045  (2006.01)
(52) U.S. Cl. ................................ 369/59.25
(58) Field of Classification Search .............. 369/59.25
See application file for complete search history.

(56) References Cited

U.S. PATENT DOCUMENTS 6,477,313 B1 * 11/2002 Itoi .............................. 386/52
6,728,469 B1 * 4/2004 Okazaki et al. ................ 386/68
2002/0091851 A1 * 7/2002 Yoon et al. .................. 709/231

FOREIGN PATENT DOCUMENTS

| EP | 737 975 A2 | 10/1996 |
|----|------------|---------|
| EP | 1 021 048 | 7/2000 |
| WO | 00/14744 | 3/2000 |
| WO | 01/54126 | 7/2001 |

* cited by examiner

Primary Examiner—Thang V. Tran
Assistant Examiner—Michael V. Battaglia
(74) Attorney, Agent, or Firm—Joseph J. Laks; Robert B. Levy

(57) ABSTRACT

During the recording of packetized data streams with a low bit rate, the packets are stored in data blocks having a constant size. Time stamps are used for the addressing of the data blocks, which time stamps describe the time duration which, in the case of the bit rate respectively present, is necessary for complete filling of a data block. A maximum time duration is prescribed, which corresponds to complete filling of a data block in the case of a predetermined minimum value of the bit rate. In the case of the minimum value of the bit rate being undershot, the last packet, in the time window of the maximum time duration of a data block, is not stored in this data block but rather in the subsequent data block.

3 Claims, 3 Drawing Sheets

METHOD FOR RECORDING DATA STREAMS WITH A LOW BIT RATE

This application claims the benefit under 35 U.S.C. §365 of International Application PCT/EP01/09349, filed Jul. 23, 2001, which claims the benefit of German Patent Application No. 10038549.4, filed Aug. 3, 2000.

The invention relates to a method for recording data streams with a low bit rate.

BACKGROUND OF THE INVENTION

As in the case of CD, in the case of DVD, too, there is a demand for recording apparatuses to satisfy domestic demand. Drives in accordance with different standards, such as DVD-RAM and DVD-RW, are currently in the introduction phase. Furthermore, at the present time work is under way on a so-called DVD-Streamer, abbreviated to DVD-SR. DVD-SR is intended to allow the recording and reproduction of packetized data streams, in particular also in real time.

In packetized data streams, the data are not present as a continuous stream, but rather are subdivided piece by piece into packets. Packets are formed differently in this case, depending on the area of application. Thus, two different variants are provided by the MPEG-2 Systems Standard defined in ISO/IEC 13818-1, with the program stream and the transport stream. The program stream is provided for use in applications with a low error rate and is therefore usually used for storing data streams.

Recording of packetized data streams is described in WO 00/14743 which was not published before the priority date. In this case, the packets of the incoming data stream are recorded in the form of Video Object Units (VOBU) of fixed size, a time duration which is reproduced by 12 bits being assigned to each VOBU for addressing purposes.

In order, despite the limited resolution of the time durations, to enable recording even at very low data rates, it is proposed, in the European patent application which bears the application No. 00100836 and was likewise not published before the priority date, to carry out so-called time stuffing. For this purpose, stuffing packets are provided at the end of a VOBU, which stuffing packets merely contain filling data, in particular zeros, in addition to a time stamp. Equally, VOBUs may also contain, in addition to a time stamp, exclusively filling data and no data packets whatsoever. This so-called stuffing method has the disadvantage, however, that an unnecessarily large amount of storage space is taken up.

SUMMARY OF THE INVENTION

The invention is based on the object of specifying a method for recording data streams with a low bit rate which enables sufficient utilization of the storage medium. This object is achieved by means of the method specified in claim 1.

In principle, a first method according to the invention for recording data streams with a low bit rate consists in the data streams comprising packets which, during recording, are stored in data blocks having a constant size, time stamps being used for the addressing of the data blocks, which time stamps describe the time duration which, in the case of the bit rate respectively present, is necessary for complete filling of a data block. A maximum time duration is prescribed in this case, which corresponds to complete filling of a data block in the case of a predetermined minimum value of the bit rate. In the case of the minimum value of the bit rate being undershot, the last packet, in the time window of the maximum time duration of a data block, is not stored in this data block but rather in the subsequent data block.

Preferably, the last packet of a data block in this case becomes the first packet of the subsequent data block.

In principle, a second method according to the invention for recording data streams with a low bit rate consist in the data streams comprising packets which, during recording, are stored in data blocks having a constant size, time stamps being used for the addressing of the data blocks, which time stamps describe the time duration which, in the case of the bit rate respectively present, is required for complete filling of a data block. A maximum time duration is prescribed in this case, which corresponds to complete filling of a data block in the case of a predetermined minimum value of the bit rate. In the case of the minimum value of the bit rate being undershot, during the recording into a data block, it is provided that filling data may be present at the start of the subsequent data block and afterwards data packets are contained in this subsequent data block.

Preferably, the filling data are present in the first sector of the subsequent data block, the following sectors in this subsequent data block containing data packets.

The methods according to the invention can be used particularly advantageously if the data streams are recorded on a DVD.

Further developments and advantageous refinements of the invention emerge from the claims, the rest of the description and the drawings which show exemplary embodiments of the invention.

BRIEF DESCRIPTION OF THE DRAWINGS

Exemplary embodiments of the invention are described with reference to the drawings, in which.

DETAILED DESCRIPTION

Figure 1:
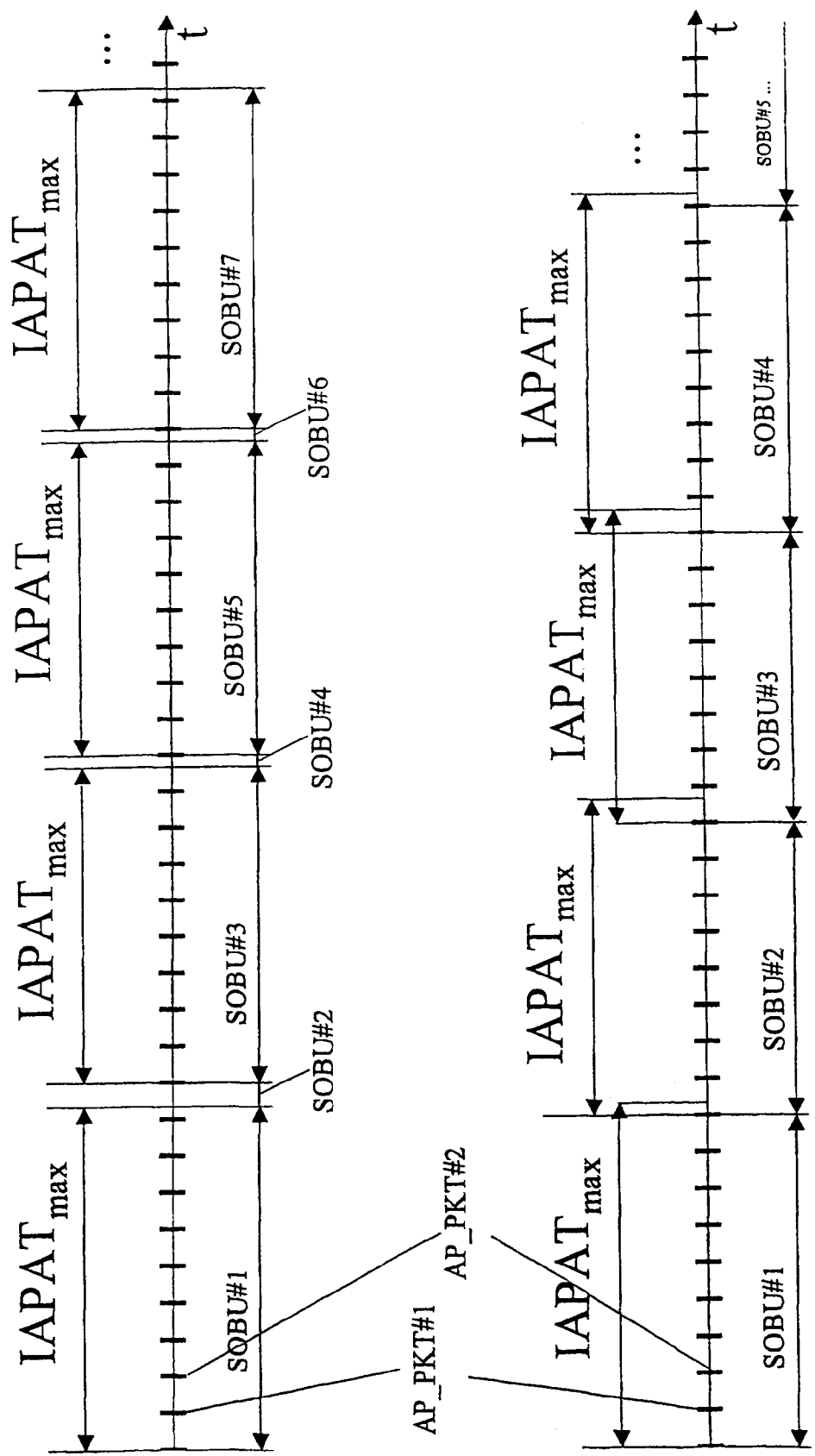
FIG. 1 shows a comparison of the time behaviour of a first method according to the invention with the previously known stuffing method.

FIG. 1 shows a conventional time stuffing method in the top half and a method according to the invention in the bottom half. The incoming data stream has data packets AP_PKT#1, AP_PKT#2, . . . , which are recorded on the DVD in the form of stream objects which are in turn subdivided into stream object units (SOBU) SOBU#1, SOBU#2, . . . of fixed size, in particular 64 kbytes. The packets are addressed by means of time stamps which are entered during recording into a mapping list in order to enable access to any desired point in the recorded data stream. Since a multiplicity of stream object units may be present, relative time stamps are used instead of absolute time stamps, in order to save storage space. For this purpose, each SOBU is assigned a value IAPAT, which corresponds to the time duration of the recorded signal segment and is reproduced by 12 bits. This results in a limited resolution of the time durations both at the bottom with $IAPAT_{min}=1$ and at the top with $IAPAT_{max}=2^{12}-2$, where $IAPAT_{max}$ may correspond e.g. to a maximum time duration of about 23 sec.

If the maximum time duration is exceeded, then the time duration of the SOBU is set to the maximum time duration $IAPAT_{max}$. The recording of data is then ended in the SOBU SOBU#1 after the maximum time duration has been reached, even though it is not yet completely "filled" with data, on account of the low data rate, and the remainder of the SOBU is filled with stuffing packets, in particular zeros. Since, at very low data rates, the data packets are separated from one another by long signal pauses, when the maximum time duration is reached, in most cases a signal pause will be present rather than a data packet. Moreover, since an SOBU is not supposed to begin with stuffing packets, in the conventional time stuffing method firstly at least one more empty SOBU SOBU#2 is recorded, which only contains time stuffing packets, so that the next data packet is stored as first packet of a subsequent SOBU.

The storage consumption caused by the time stuffing outlined can be reduced by the IAPAT value of an SOBU which would have to be ended prematurely by time stuffing being allocated a smaller value than the maximum value of IAPAT. The value is chosen such that the AP_PKT which should actually be the last of this SOBU becomes the first of the next SOBU. As a result, there is no need to store a completely empty time stuffing SOBU, since this next SOBU begins with an AP_PKT and thus, following the definition for time stuffing, can receive further AP_PKTs, whereas the empty time stuffing SOBU, following the definition for time stuffing, must not receive any further AP_PKTs whatsoever, since, after all, it already begins with time stuffing.

Figure 2:
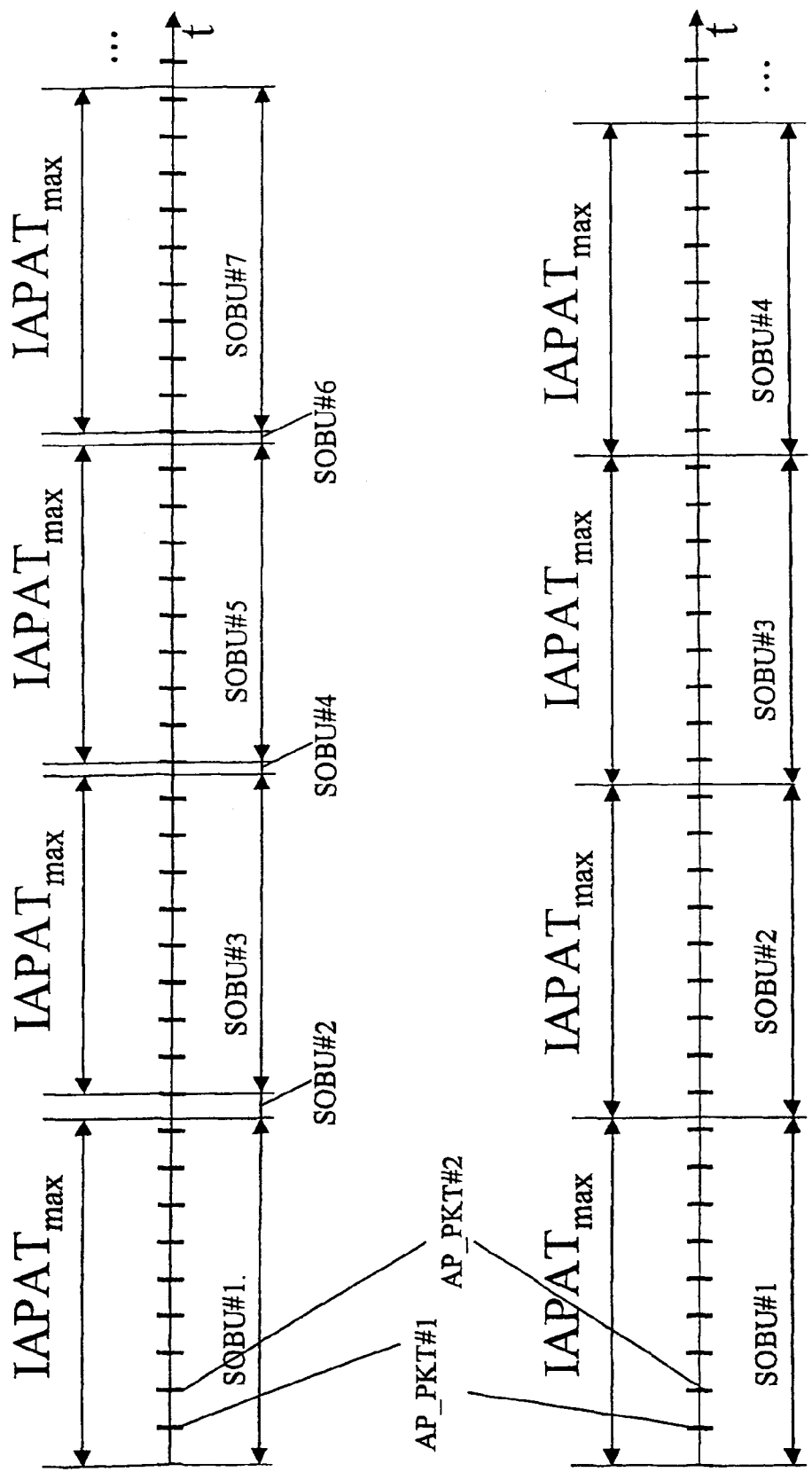
FIG. 2 shows a comparison of the time behaviour of a second method according to the invention with the previously known stuffing method.

FIG. 2 likewise shows the conventional time stuffing method in the top half and a further method according to the invention in the bottom half. In this case, an SOBU is permitted to have time stuffing in the first sector and the following sectors are permitted to contain AP_PKTs. As a result, there is no need to store a completely empty time stuffing SOBU, since, after an SOBU with time stuffing, an SOBU is permitted to exist which begins with time stuffing and nevertheless allows the recording of further AP_PKTs. Thus, the SOBUs may have maximum time durations and nevertheless all contain AP_PKTs. The lower the data rate, the greater the storage efficiency of this method in comparison with the previous method and the method described above.

Figure 3:
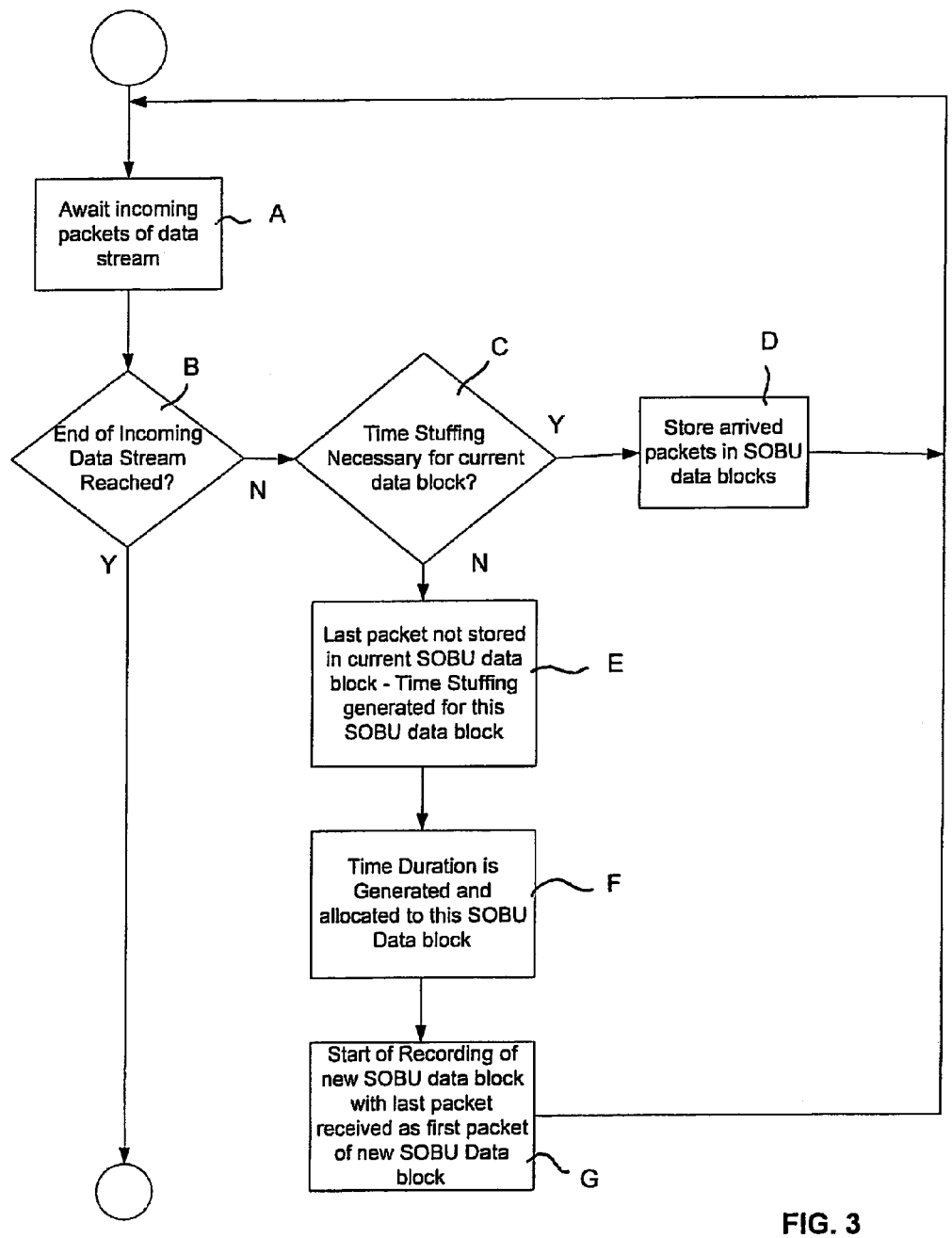
FIG. 3 shows a flow diagram for the method according to the invention.

FIG. 3 shows a flow diagram for the method according to the invention. Firstly, in step A, incoming packets of the data stream are awaited. If the end of the incoming data stream has not been reached in step B, then a check is made in step C to determine whether time stuffing is necessary for the current data block. If time stuffing is not necessary, then in step D the arrived packets are stored in the SOBU data blocks. However, if time stuffing is necessary, then in step E the last packet that arrives is not stored in the current SOBU data block and time stuffing is generated for this SOBU data block. In step F, a time duration is then generated which describes the time from the start of this presently concluded data block until the last received packet. This time duration is then allocated to this SOBU data block. Step G sees the start of the recording of a new SOBU data block with the last packet that was received as first packet of this new SOBU data block.

The invention can be used in a wide variety of apparatuses for recording data streams with a low bit rate, in particular in a so-called DVD-Streamer.

What is claimed is:

1. A method for recording data streams with a low bit rate, the data streams comprising packets (AP_PKT#1, AP_PKT#2) which, during recording, are stored in data blocks (COBU#1, SOBU#2, . . .) having a constant size, and time stamps being used for addressing the data blocks, the said time stamps describing the time duration (IAPAT) which, in the case of the bit rate respectively present, is required for complete filling of data block, and a maximum time duration (IAPATmax) being prescribed, which corresponds to complete filling of a data block in the case of a predetermined minimum value of the bit rate, the method comprising the steps of:

not storing the last packet in a time window of the maximum time duration of the data block when the predetermined minimum value of the bit rate is undershot; and storing the last packet in a subsequent data block.

2. The method according to claim 1, wherein the last packet of the data block becomes the first packet of the subsequent data block.

3. The method according to claim 1, wherein the data streams are recorded on a DVD.

* * * * *